(12) United States Patent
Appleyard et al.

(10) Patent No.: US 9,085,320 B2
(45) Date of Patent: Jul. 21, 2015

(54) STEERING COLUMN ASSEMBLY

(75) Inventors: Michael Appleyard, Cheltenham (GB); David Ward, Monthmouthshire (GB); Mark Anthony Wilkes, Birmingham (GB)

(73) Assignee: TRW Limited, West Midlands (GB)

( * ) Notice: Subject to any disclaimer, the term of this patent is extended or adjusted under 35 U.S.C. 154(b) by 1195 days.

(21) Appl. No.: 11/991,318

(22) PCT Filed: Aug. 21, 2006 (Under 37 CFR 1.47)

(86) PCT No.: PCT/GB2006/003126
§ 371 (c)(1),
(2), (4) Date: Sep. 4, 2009

(87) PCT Pub. No.: WO2007/026118
PCT Pub. Date: Mar. 8, 2007

(65) Prior Publication Data
US 2010/0139438 A1 Jun. 10, 2010

(30) Foreign Application Priority Data

Sep. 1, 2005 (GB) .................................. 0517780.3
Sep. 1, 2005 (GB) .................................. 0517781.1
Dec. 20, 2005 (GB) .................................. 0525850.4

(51) Int. Cl.
*B62D 1/184* (2006.01)
(52) U.S. Cl.
CPC ....................................... *B62D 1/184* (2013.01)
(58) Field of Classification Search
CPC .............................. B62D 1/184; B62D 1/185
USPC ............. 280/775, 777; 74/492, 493, 494, 495
See application file for complete search history.

(56) References Cited

U.S. PATENT DOCUMENTS 4,079,487 A * 3/1978 Coop, Sr. ......................... 24/277
4,648,624 A   3/1987 Mouhot et al.

(Continued)

FOREIGN PATENT DOCUMENTS

EP   0368700   5/1990
EP   0498126   8/1992

(Continued)

OTHER PUBLICATIONS

Notification of the Second Office Action, Chinese Application No. 200680032094.4, dated Oct. 16, 2009.

*Primary Examiner* — William Kelleher
*Assistant Examiner* — Emily Cheng
(74) *Attorney, Agent, or Firm* — MacMillan, Sobanski & Todd, LLC

(57) ABSTRACT

A steering column assembly includes a steering column shroud comprising an inner member and an outer member, the inner member being at least partially received within the outer member, a support bracket which is fixed in position relative to a part of the vehicle, the outer member passing between two spaced apart arms of the bracket, and a clamp assembly which includes a cam mechanism movable between a locked position in which the clamp assembly fixes the inner member and outer member in position relative to the support bracket and an unlocked position in which the clamp assembly permits movement of at least one of the inner and outer members relative to the support bracket. The clamp assembly includes a clamp pin which passes through openings in each of the two arms of the bracket, the clamp pin being provided with a first reaction member located towards one end of the pin outside of one arm of the clamp bracket and a second reaction member located towards the other end of the clamp pin outside of the other arm of the clamp bracket such that the arms of the bracket are clamped between the reaction members so as to provide a pre-load to the bracket arms, and in which both reaction members are prevented from rotating relative to the pin during use, and one reaction member is located at least partially within a cavity formed in a part of the cam mechanism. The outer member may also include an elongate slit that extends beyond a steering lock mechanism fitted to the assembly.

18 Claims, 2 Drawing Sheets

(56) References Cited

U.S. PATENT DOCUMENTS

| | | | |
|---|---|---|---|
| 5,090,730 A * | 2/1992 | DuRocher et al. | 280/775 |
| 5,383,811 A * | 1/1995 | Campbell et al. | 464/89 |
| 5,595,399 A * | 1/1997 | Fouquet et al. | 280/777 |
| 5,622,446 A * | 4/1997 | Hibberd | 403/377 |
| 5,655,413 A | 8/1997 | Barton | |
| 5,669,633 A * | 9/1997 | Naff et al. | 280/777 |
| 5,722,299 A * | 3/1998 | Yamamoto et al. | 74/493 |
| 5,735,536 A * | 4/1998 | Myers et al. | 280/7.13 |
| 5,921,577 A | 7/1999 | Weiss et al. | |
| 6,604,439 B2 | 8/2003 | Gaukel | |
| 6,623,036 B2 * | 9/2003 | Yamamura et al. | 280/775 |
| 7,267,025 B2 * | 9/2007 | Ko et al. | 74/493 |
| 7,464,944 B2 * | 12/2008 | Lyden | 280/11.27 |
| 2002/0011725 A1 | 1/2002 | Lutz | |
| 2002/0089161 A1 * | 7/2002 | Yamamura et al. | 280/777 |
| 2002/0148673 A1 * | 10/2002 | Menjak et al. | 180/444 |
| 2003/0221505 A1 * | 12/2003 | Schick et al. | 74/493 |
| 2004/0035238 A1 * | 2/2004 | Jolley et al. | 74/493 |
| 2004/0051302 A1 * | 3/2004 | Canale | 285/7 |
| 2004/0134301 A1 | 7/2004 | Ko et al. | |
| 2004/0239089 A1 * | 12/2004 | Armstrong et al. | 280/775 |
| 2005/0012316 A1 * | 1/2005 | Ben Rhouma et al. | 280/777 |
| 2005/0050978 A1 | 3/2005 | Lee | |
| 2005/0081675 A1 * | 4/2005 | Oshita et al. | 74/493 |
| 2005/0093284 A1 * | 5/2005 | Sato et al. | 280/777 |
| 2010/0139438 A1 * | 6/2010 | Appleyard et al. | 74/493 |

FOREIGN PATENT DOCUMENTS

| | | | | |
|---|---|---|---|---|
| EP | 0 839 702 A2 | 5/1998 | | |
| EP | 1223096 | 7/2002 | | |
| EP | 1 529 714 A2 | 5/2005 | | |
| EP | 1529714 A2 * | 5/2005 | | B62D 1/187 |
| FR | 2 717 762 | 9/1995 | | |
| FR | 2 768 204 | 3/1999 | | |
| GB | 776357 | 6/1957 | | |
| GB | 2 116 496 A | 9/1983 | | |
| JP | 2005138729 A * | 6/2005 | | B62D 1/18 |
| WO | WO 2004/089722 A1 | 10/2004 | | |
| WO | WO 2005/037627 A1 | 4/2005 | | |

* cited by examiner (a) (b)

(a) (b)

(a)             (b)

US 9,085,320 B2

STEERING COLUMN ASSEMBLY

CROSS-REFERENCE TO RELATED APPLICATIONS

This application is a National Stage of international Application No. PCT/GB2006/003126 filed Aug. 21, 2006, which claimed priority to Great Britain Patent Application No. 0517780.3 filed Sep. 1, 2005, Great Britain Patent Application No. 0517781.1 filed Sep. 1, 2005, and Great Britain Patent Application No. 0525850.4 filed Dec. 20, 2005, the disclosures of all of which are incorporated herein by reference in their entirety.

BACKGROUND

Various embodiments of a steering column assembly are described herein. In particular, the embodiments described herein relate to improvements in steering column assemblies.

Steering column assemblies for automotive vehicles and the like are increasingly required to be adjustable for rake and, in many cases, reach. This requires the column shroud, within which the steering column is rotatably located, to be fixed to the vehicle by a clamp assembly which can be locked and unlocked to either prevent movement or permit adjustment of the column shroud position respectively.

One common arrangement uses a column shroud which comprises an inner tubular member and an outer tubular member which telescope one inside the other to permit reach adjustment. A fixing rail welded to one of the tubes is secured to a support bracket by a releasable clamp assembly. A simple single adjust mechanism includes a generally vertical elongate slot in the support bracket. The clamp assembly can then move along the slot when in the unlocked position to provide rake adjustment. Reach adjustment can be achieved by providing an elongate slot in the guide rail generally parallel to the axis of the column through which the clamp assembly passes.

Other mechanisms have been proposed for clamping the tubes to the support bracket.

BRIEF SUMMARY

According to a second aspect, the steering column assembly comprises a steering column shroud which supports a steering shaft for a steering wheel, the column shroud comprising an inner member and an outer member, the inner member being at least partially received within the outer member, a support bracket which is fixed in position relative to a part of the vehicle, the outer member passing between two spaced apart arms of the bracket, and a clamp assembly which includes a cam mechanism movable between a locked position in which the clamp assembly fixes the inner member and outer member in position relative to the support bracket and an unlocked position in which the clamp assembly permits movement of at least one of the inner and outer members relative to the support bracket, and in which the clamp assembly includes a clamp pin which passes through openings in each of the two arms of the bracket, the clamp pin being provided with a first reaction member located towards one end of the pin outside of one arm of the clamp bracket and a second reaction member located towards the other end of the clamp pin outside of the other arm of the clamp bracket such that the arms of the bracket are clamped between the reaction members so as to provide a pre-load to the bracket arms, and in which both reaction members are prevented from rotating relative to the pin during use, and one reaction member is located at least partially within a cavity formed in a part of the cam mechanism.

One of the reaction members may comprise a nut which co-operates with the pin through a threaded engagement such that the pin prevents the reaction member from rotating relative to the pin. By this we may mean that the peak torque expected to be applied to the reaction member in use of the assembly is less than the prevailing torque required to rotate the reaction member relative to the pin. By this we may also mean that the reaction member may be intentionally rotated by applying a torque in excess of this peak torque. This enables the nut to be rotated during assembly to adjust the pre-load, i.e. it is adjustable.

Where one reaction member is adjustable the other may be fixed. By this we may mean that it cannot be moved relative to the pin during normal use or even for adjustment by applying abnormal loads. Of course, a common sense interpretation is required here since it is clear that any reaction member can be moved if subject to enough force.

In one arrangement, the reaction member within the cavity may be adjustable and the other fixed.

In another arrangement, the reaction member within the cavity may be fixed and the other adjustable.

The fixed reaction member may comprise a circlip, or may be prevented from movement by way of engagement with a part of the assembly other than the pin. For example, it may be keyed to the bracket or another component which is fixed relative to the bracket or the pin.

Where the adjustable reaction member comprises a nut it may have a stiff thread engagement. By this we may mean that the nut presents a high resistance against rotation when threaded onto the pin. For example, metal nuts with deformable plastic linings that grip the thread of the pin could be used. The torque required to turn the nut should exceed the maximum torque generated by the maximum tensile load applied to the pin when it is reacted by the nut. This will depend on the angle of the thread and the friction between the nut and the pin. A nylon insert may be provided inside the nut which is bitten into by the thread on the pin. The nut may be of the "self locking" type.

Of course, the nut may be a standard nut and the thread of the pin may be modified to provide a stiff thread, perhaps by coating the pin with a plastic material such as nylon or making the pin from a material that may be readily deformed as the nut is rotated.

The adjustable lock nut may engage a threaded portion of the clamp pin and may be prevented from rotation relative to the pin only by the friction inherent between the stiff thread and the thread of the pin.

The other reaction means may comprise a fixed nut or washer or any other reaction means which in use is preferably not adjustable once assembled. This means that in assembly it is only the nut with the stiff thread that is adjustable to set the load on the clamp pin. It may, for example, comprise a circlip or other fixed reaction means. This may be press fitted to the pin such that it will not slide along the pin accidentally. It may perhaps be a face defined by a step change in diameter of a cylindrical pin. If a pin having a non-circular cross section is used, a protrusion formed into the pin could be provided to define the face.

The cam mechanism may be provided towards one end of the pin comprising a fixed cam portion and a moving cam portion, the fixed portion being fixed relative to the pin and other portion movable relative to the pin, and a third reaction member may be provided which is located towards one end of the pin such that the clamp assembly is located between the third reaction member and one of the other reaction members.

The adjustable reaction member may be located on the clamp pin partially or wholly within a recess provided in the fixed part or the moving part of the cam mechanism. Preferably it is within the fixed part which may be keyed to the bracket to prevent it rotating. This recess where present may completely clear the reaction member so that it is only the co-operation between reaction member and pin that prevents it from moving once the pre-load has been set. For example, a fixed portion of the cam mechanism may be provided with a recess that accommodates the width of the stiff nut whilst enabling the fixed portion to be keyed to the bracket so that it does not rotate.

Alternatively, the circlip may be provided within the cam mechanism and the stiff nut provided at the other end of the clamp pin.

A spring, such as a Belleville washer may be provided between the third reaction member and the cam mechanism which determines at least in part the force required to rotate the handle. A Belleville washer is a compact type of spring in the shape of a washer that has been pressed into a dished shape and then hardened and tempered. A stack of Belleville washers may be provided. Two or more washers may be provided back to back.

The washer, or washers, may be made from spring steel.

In an alternative embodiment, one of the reaction members may comprise a nut having an external shape, the nut engaging a correspondingly shaped recess in the cam mechanism. The shape may be hexagonal, and so the nut may comprise a (standard) nut.

The inner and outer members are preferably tubular, and most preferably tubular cylindrical The bracket may be U shaped having a base from which the arms depend. One or more upstanding portions may be provided for attaching the bracket to a fixed part of the vehicle chassis.

According to a second aspect the invention comprises a steering column assembly comprising a steering column shroud which supports a steering shaft for a steering wheel, the column shroud comprising an inner member and an outer member, the inner member being at least partially received within the outer member, a support bracket which is fixed in position relative to a part of vehicle, and a clamp assembly which is movable between a locked position in which the clamp assembly fixes the inner member and outer member in position relative to the support bracket and an unlocked position in which the clamp assembly permits movement of at least one of the inner and outer members relative to the support bracket, and in which the clamp assembly comprises: a clamp pin that passes through an opening in the bracket, a reaction member fixed in position along the pin, a cam mechanism located between the reaction member and the opening in the bracket including a fixed portion that is fixed in position on the pin and a moving portion that is movable relative to the pin, and in which at least one Belleville washer is provided between the reaction member and the bracket, the washer determining at least in part the force required to rotate the moving portion of the cam mechanism.

The washer may be located between the reaction member and the cam mechanism.

Preferably a stack of two or more, or perhaps at least four Belleville washers may be provided. They may all be identical.

A reaction member may be located between the lock nut and the Belleville washer or washers to provide a face upon which they react.

Preferably the bracket has two spaced arms that surround a guide rail fixed to the column shroud, the guide rail having nominally parallel side walls that are aligned with the arms, the clamp pin passing through the arms and the guide rail. Generally vertical openings in the arms may be provided to permit the clamp pin and hence guide rail to move up and down relative to the bracket.

If the walls of the guide are not parallel, the amount of free play that may be present in the system will vary as the guide rail moves up and down. This free play may be taken out by the Belleville washers.

According to a third aspect the invention provides a steering column assembly comprising a steering column shroud which supports a steering shaft for a steering wheel, the column shroud comprising an inner member and an outer member, the inner member being at least partially received within the outer member, a support bracket which is fixed in position relative to a part of vehicle, and a clamp assembly which is movable between a locked position in which the clamp assembly fixes the inner member and outer member in position relative to the support bracket and an unlocked position in which the clamp assembly permits movement of at least one of the inner and outer members relative to the support bracket, and in which the outer member includes an elongate slot extending along a portion of the outer member such that when the clamp assembly is in the locked position it squeezes the edges of the slot of the outer member together thereby to at least partially close the slot which in turn clamps the outer member to the inner member, and in which the slot in the outer member extends along the shaft such that it passes below a steering lock mechanism which is fixed in position relative to the outer tube.

Such an arrangement with a slot ensures that movement of the clamping assembly from the unlocked to the locked position not only clamps the column shroud to the bracket but also simultaneously locks the inner member to the outer member.

The outer member may be provided with a cover sleeve over a portion of its length covering the slot, the sleeve providing support for the steering lock mechanism.

The outer member may be tubular and the sleeve may comprise an additional tubular sleeve which fits around a portion of the outer tube and which is secured to the outer tube at a point along the shaft which is on the opposite side of the steering lock mechanism to the clamp.

The sleeve is preferably sufficiently rigid that it does not collapse onto the outer tube with sufficient force to close the slot when the steering lock mechanism is fastened in place.

The steering lock mechanism may include a saddle type clamp which secures it to the sleeve, and a lock pin which passes through the outer tube at least when in the locked position.

The slot may extend for at least 2 times the diameter of the outer tube.

The outer tube may have a reduced diameter in the region covered by the additional sleeve such that the sleeve has the same diameter as the portion of outer tube that it not of reduced diameter. This portion may be the portion that is clamped together. This reduction could be obtained by swaging.

The outer sleeve may be fixed to the outer tube by a continuous weld or a number of spot welds in region beyond the extent of the slot in the outer tube.

It will of course be understand that any of the features of the first, second and third aspects of the invention may be combined with each other and although such combinations are not explicitly disclosed hereinbefore any such combination is to be understood to be implicitly disclosed in this description.

For example, the first aspect of the invention may be combined with a steering column shroud having a slit according to the third aspect.

Other advantages of the steering column assembly will become apparent to those skilled in the art from the following detailed description of the various embodiments, when read in light of the accompanying drawings.

DETAILED DESCRIPTION OF THE INVENTION

Figure 1:
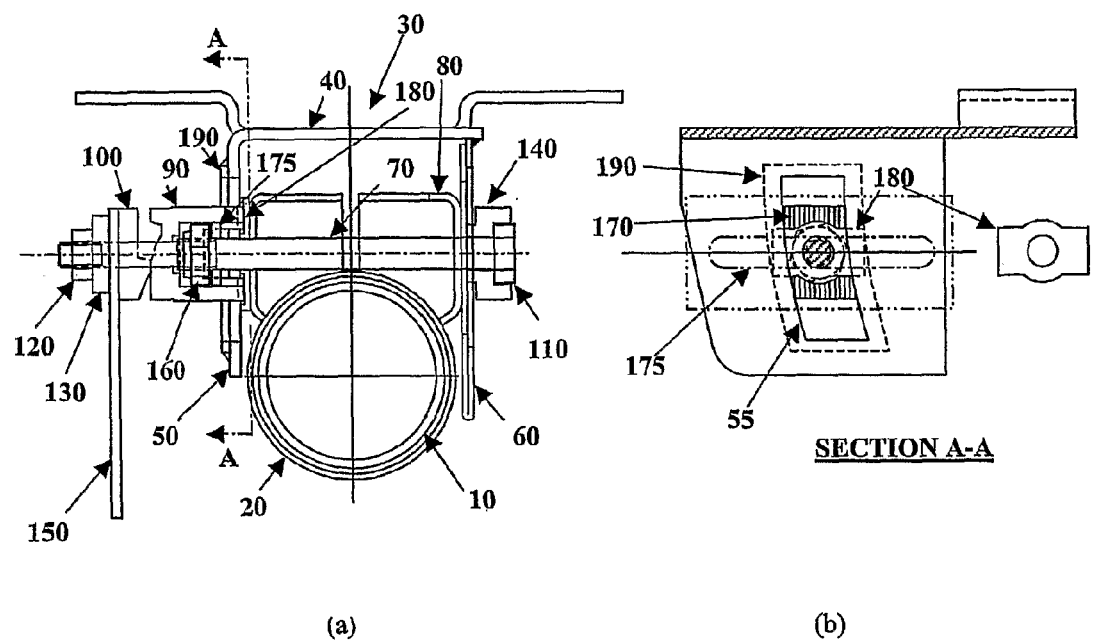
FIGS. 1(a) and (b) show a first embodiment of a steering column assembly in accordance with the present invention.

As shown in FIG. 1, a steering column assembly comprises a sleeve that comprises an inner member 10 and an outer member 20 which receives a portion of the inner member 10. The inner and outer members 10,20 are of metal and tubular cylindrical with the inside diameter of the outer member 20 being only slightly greater than the outside diameter of the inner member 10 so as to permit relative movement between them by sliding. In the example, the inner member passes into a gearbox housing (not shown) whilst the outer member extends away from that towards a steering wheel as is known in the art. The wheel is supported by a telescopic steering shaft (not shown) that is free to rotate within the steering column shroud. It is located within the shroud by bearings. In other arrangements the outer shroud member may connect to the gearbox housing and the inner extend away from that.

The steering column shroud 10,20 is fixed pivotally via a gearbox housing (not shown), to a part of the vehicle body and also to a support bracket 30 secured to the body of the vehicle by a clamp assembly. The bracket 30 is typically welded or bolted in place in a region under the dashboard and is positioned along the shroud at a point somewhere between the pivot and the steering wheel. The clamp assembly can be locked or unlocked to allow the rake of the steering column to be adjusted by pivoting about the pivot. When locked the steering column cannot be moved other than in an accident.

The bracket 30 comprises a metal component of U shape having a base 40 and two depending arms 50,60 which extend vertically downwards from either side of the base 40. The shroud passes between the arms 50,60. The arms each include an elongate opening 55,65 through which a clamp pin 70 is provided. The pin 70 passes through openings in a guide rail 80 fixed to the top of the outer tube 20 by welding. The slots in the arms allow the position of the shroud to be adjusted for rake by permitting the clamp pin 70 to move up and down within the slots.

The pin 70 is provided with a cam locking mechanism including a fixed portion 90 and moving portion 100 being provided on the side of the fixing arm 50 opposite the guide rail 80. Towards each end of the pin 70 is provided a reaction means 110, 120. A thrust bearing 130 is also provided between the reaction means 120 and the cam. Moving the cam 100 causes a force to be exerted between the reaction means 110,120 as the pin 70 is placed in tension and this causes the arms 50,60 of the bracket 30 to be squeezed together to clamp onto the guide rail 80 attached to the outer member 20.

In more detail, the clamp pin 70 is provided with components in the following order starting at one end: thrust nut 120, thrust bearing 130, cam mechanism comprising moving portion 100 and fixed cam portion 90; one bracket arm 50, the other bracket arm 60, a reaction block 140 and a first reaction means 110. A handle 150 is attached to the moving cam portion 100 to enable it to be rotated around the clamp pin 70 by a driver.

The thrust nut 120 defines a reaction member that comprises an adjustable nut which is threaded onto an end region of the clamp pin. The moving and fixed cam portions comprise a pair of facing ramps and two opposing reaction faces. The fixed cam 90 is restrained from rotation by its engagement with the elongate slot in the bracket arm 50 as shown in FIG. 1(b).

The first reaction member 110 comprises a hexagonal nut form fixed to the pin 70 and which is located within a complimentary hexagonal cut-out in the reaction block 140. The reaction block 140 is prevented from rotation by its engagement with the slot in the arm 60 of the bracket adjacent the block. This arrangement prevents the pin 70 from rotating relative to the bracket arm 60.

In use, as the moving portion 100 of the cam mechanism is rotated the ramp of the moving face slides over the ramp of the fixed portion to increase or decrease the distance between the reaction faces. The first reaction means 110 also comprises a non-adjustable nut or other fastening.

Also provided along the clamp pin 70 is a further reaction member comprising an adjustable nut 160 having a stiff thread. This is screwed onto a threaded portion of the clamp pin 70 adjacent the outside face of the clamp bracket arm nearest the cam mechanism (i.e. on the same side of the clamp bracket arm as the cam mechanism). This nut 160 provides an anti-dumping role in that its position along the pin 70 relative to the reaction means 110 at the other end of the clamp pin 70 determines the clamp force that is applied to the arms 50,60 when the cam mechanism is fully unlocked. Importantly this should be sufficient to prevent free play and provide a good feel, yet not so high as to introduce excessive friction into the assembly that could make movement of the outer tube relative to the clamp too stiff. The anti-dumping nut 160 prevents unwanted spreading of the arms in the unlocked position.

More specifically, the anti-dumping nut 160 is a thin prevailing torque nut with a stiff thread. This may be a steel or brass nut with a nylon insert as is known in the art of stiff thread nylon insert nuts. Alternatively it may be a self locking type nut. The nut 160 is located within a recess provided in the fixed cam portion 90. By stiff thread we mean that the nut will not rotate under the loads applied to it by the clamp assembly and will stay fixed in position after initial assembly. In the embodiment of FIG. 1 a plastic pad 180 is provided between the nut and the bracket 30 to reduce the amount of friction present.

Alternatively, the stiff nut 160 could be replaced with a normal nut whose hexagonal outer form engages with a corresponding hexagonal shaped recess in the fixed cam portion 90. This nut would then be secured against unwanted rotation once the assembly of all the parts is completed.

Also shown in FIG. 1(b) is a row of reach adjustment teeth 170 provided on the guide rail 80. These surround the opening 175 through which the clamp pin 70 passes. This opening 85 is elongate extending in a direction parallel to the axis of the outer tube 20. The opening permits reach adjustment of the assembly. The teeth cooperate with corresponding teeth on the fixed cam 90.

Also shown is an additional spacer plate 190 welded to the arm of the bracket which is adjacent the cam mechanism. This slot provides additional thickness to the arm at that location to ensure robust engagement with the cam fixed portion as it moves to the left when moving from the locked to unlocked position. Depending on the thickness of material used for the arm this may not be required.

Figure 2:
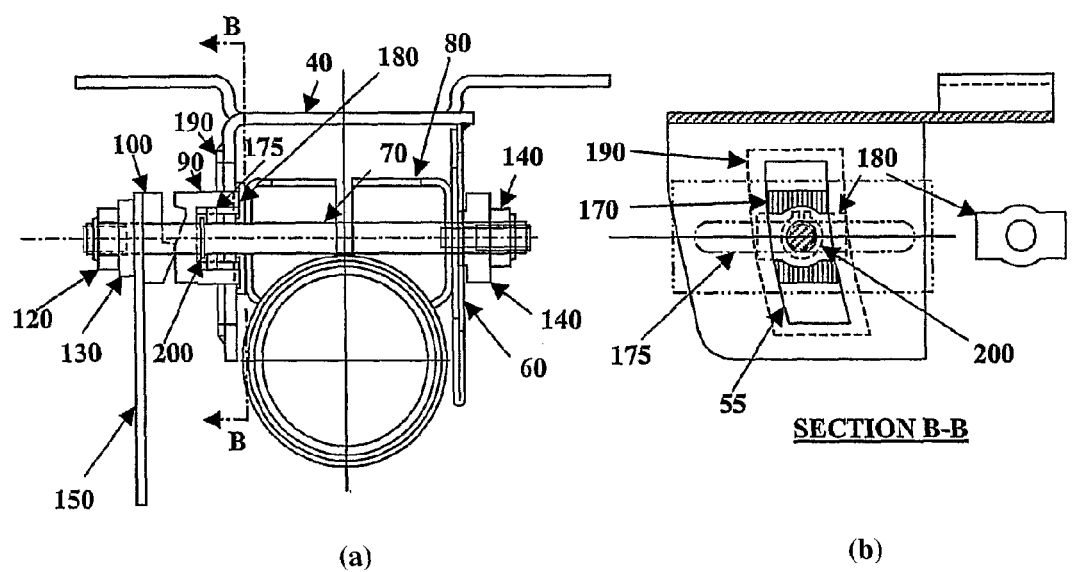
FIGS. 2(a) and (b) show a second embodiment of a steering column assembly in accordance with a first aspect of the present invention.

An alternative embodiment is illustrated in FIGS. 2(*a*) and (*b*) of the accompanying drawings. For ease of reference, the same reference numerals are used in these Figures as used in FIGS. 1(*a*) and (*b*) where like components are shown.

In this arrangement a fixed washer or circlip 200 is provided in the location of the stiff threaded anti-dump nut. The reaction member at the other end of the clamp pin 70 is adjustable because it is no longer received in a recess in the reaction member 140. This nut is therefore the primary means to determine the amount of slack when the clamp assembly is locked. This would also be a stiff thread nut although other types of adjustable fastener could be provided. This provides an advantage over the embodiment shown in FIG. 1 in that the adjustable nut is accessible in use. In FIG. 1 it is obscured by the cam mechanism. As with FIG. 1, a plastic pad may be provided between the circlip 200 and the bracket arm 50.

In an alternative embodiment (not shown) the circlip 200 may be replaced by a shoulder formed by the transition in the diameter of the pin 70 from a larger diameter (e.g. 8 mm) to the left of the plastic pad 180 to a smaller diameter (e.g. 6 mm) to the right of the left surface of the plastic pad 180.

To assist in the adjustment of the nut 110 the clamp pin has a D-shaped flat in the region that passes through the reaction block which in turn is prevented from rotation by its engagement with the slot in the arm 60 adjacent the reaction block.

Figure 3:
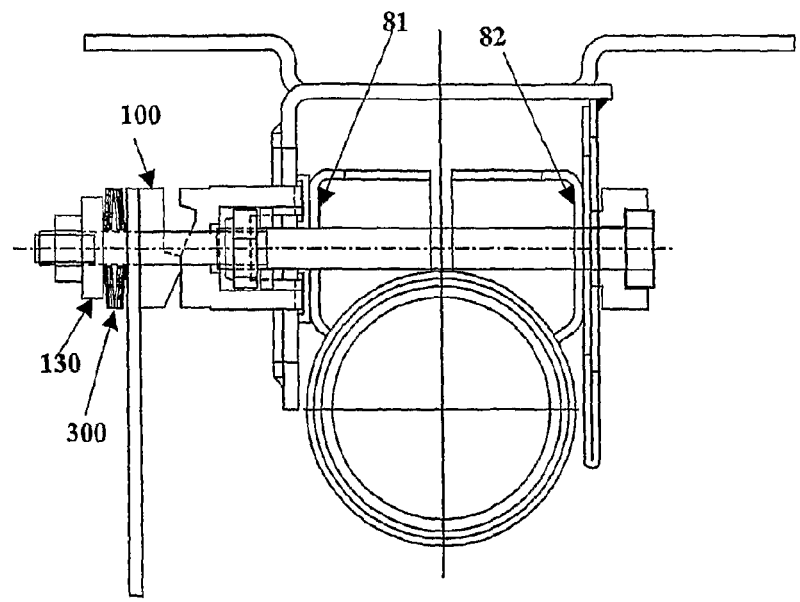
FIG. 3 shows a third embodiment of a steering column assembly in accordance with a second aspect of the present invention.

A still further embodiment is shown in FIG. 3 of the accompanying drawings. Again, the same reference numerals used in FIGS. 1 and 2 have been used for like parts.

In this arrangement, a stack of Belleville washers 300 is provided between the moving cam portion 100 and the thrust bearing 130. The applicant has appreciated that providing these disc springs makes the clamp pin tension less susceptible to longitudinal out-of-parrallelism of the side walls 81,82 of the guide rail 80. The washers 300 provide compliance to the clamp bolt assembly without which the cam mechanism is purely generating a displacement of the fixed cam rather than a desired clamping force. This arrangement reduces the effects of manufacturing tolerances on the clamping force achieved.

It is to be noted that the feature of the Belleville washers could be incorporated into the assembly of the first and second embodiments if desired.

Figure 4:
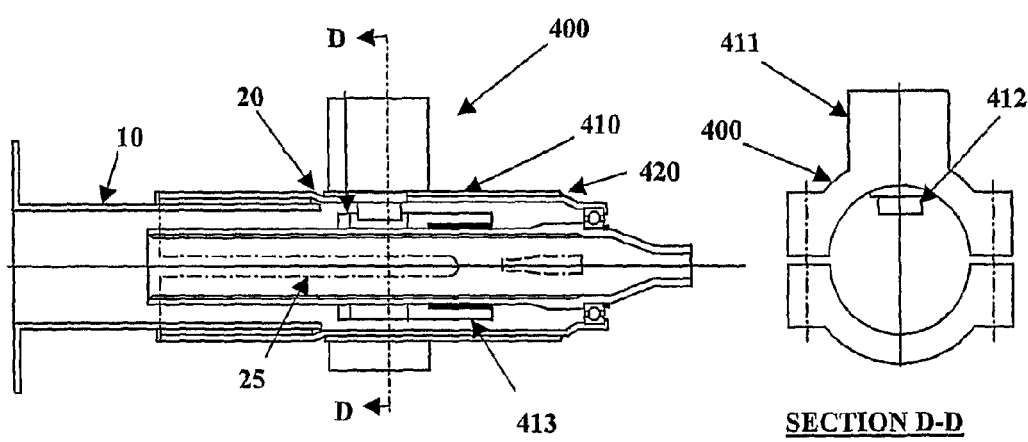
FIGS. 4(a) and (b) show a fourth embodiment of a steering column assembly in accordance with the present invention.

A final embodiment is shown in FIGS. 4(*a*) and (*b*) of the accompanying drawings. This embodiment is significantly different to the first three in that it is not a top clamp assembly and does not rely on the squeezing together of the arms as the sole means of clamping the inner and outer tubes together. This embodiment may allow an anti-theft lock mechanism to be fixed to the column shroud without it squeezing the outer member and so influencing the clamping behaviour of the outer member on the inner member.

Instead, a slot 25 is provided in the outer tube 20 and the outer tube is clamped in such a way that when locked the slot is closed at least partially to clamp the outer tube 20 around the inner tube 10. This squeezing action could be provided in many possible ways such as closing a loop of material around the outer tube to squeeze the tube against one or more of the arms of a support bracket, or as described with reference to the previous embodiments.

It has been noted by the applicant that it is beneficial to make the slot 25 as long as possible, thus reducing the clamping force needed to close the slot and also making the clamping force more consistent. In many applications, however, the length of column available for a slot is relatively short since it is required to fasten a steering column lock mechanism to the outer tube between the bracket and the steering wheel. Since these locks are traditionally clamped around the tube using a saddle clamp the slot would inevitably close up as the saddle clamp is tightened.

In the arrangement shown in FIGS. 4(*a*) and (*b*), the slot 25 extends along the outer tube 20 such that it passes under a steering column lock mechanism 400. To prevent the lock mechanism from squashing the tube and closing the slot, a sleeve 410 in the form of an additional tube is provided around the outer tube 20 in this region. The sleeve 410 takes the clamp force of the saddle clamp of the steering column lock. The sleeve 410 is welded (at 420) to the outer tube 20 at or towards one end only, which is the end facing away from the bracket and beyond the end of the slot 25.

The lock mechanism shown is a traditional design in which a block 411 containing a lock bolt 412 is clamped around the outer tube. When in a locked position the bolt extends into a receiver 413 clamped to the steering shaft to prevent it rotating relative to the outer tube.

As shown in FIG. 4, the outer tube 20 may be swaged down in diameter from a point between the bracket 30 and the location of the weld 415 such that the diameter of the shroud can be the same as or similar to the unswaged diameter of the outer tube 20. Hence in the case where the original outer tube member was unswaged in this area the connecting diameter of the lock mechanism to the column shroud is not affected by the addition of sleeve 410.

This arrangement enables a slot 25 having a length of perhaps 2 times, or 3 times the outer tube diameter to be provided in most typical applications.

In accordance with the provisions of the patent statutes, the principle and mode of operation of the steering column assembly have been explained and illustrated in its preferred embodiment. However, it must be understood that this invention may be practiced otherwise than as specifically explained and illustrated without departing from its spirit or scope.

The invention claimed is:

1. A steering column assembly for a vehicle comprising:
   a steering column shroud which supports a steering shaft for a steering wheel, said steering column shroud comprising an inner member and an outer member, said inner member being at least partially received and slidably mounted within said outer member,
   a support bracket which is fixed in position relative to a part of said vehicle, said outer member passing between two spaced apart arms of said support bracket, and
   a clamp assembly which includes a cam mechanism movable between a locked position, in which said clamp assembly fixes said inner member and outer member in position relative to said support bracket, and an unlocked position, in which said clamp assembly permits movement of at least one of said inner and outer members relative to said support bracket, wherein
   said clamp assembly includes a clamp pin which passes through openings in each of said two arms of said support bracket, said clamp pin including, in order along the clamp pin starting at one end:
   a first reaction member located towards one end of said clamp pin outside of one arm of said support bracket;
   a second reaction member located towards another end of said clamp pin outside of another arm of said support bracket such that said arms of said support bracket are clamped between said first reaction member and said second reaction member so as to provide a pre-load to said bracket arms, said second reaction member being located at least partially within a cavity formed in a part of said cam mechanism, and a third reaction member located outside of said cam mechanism and said second reaction member such that said clamp assembly is located between said third reaction member and said first reaction member, each of said first, second, and third reaction members being prevented from moving relative to said clamp pin during use.

2. The steering column assembly according to claim 1 wherein one of said reaction members comprises a nut which co-operates with said clamp pin through a threaded engagement such that said clamp pin prevents said one of said reaction members from rotating relative to said clamp pin.

3. The steering column assembly according to claim 1 wherein said first reaction member is fixed.

4. The steering column assembly according to claim 3 wherein said second reaction member within said cavity is adjustable and said first reaction member is fixed axially in position relative to said clamp pin.

5. The steering column assembly according to claim 3 wherein said second reaction member within said cavity is fixed axially in position relative to said clamp pin and said first reaction member is adjustable.

6. The steering column assembly according to claim 3 wherein one of said reaction members comprises a circlip.

7. The steering column assembly according to claim 6 wherein a spring is provided between said third reaction member and said cam mechanism which determines at least in part the force required to rotate a handle.

8. The steering column assembly according to claim 1 wherein one of said reaction members comprises a nut having a thread engagement.

9. The steering column assembly according to claim 8 wherein said nut is provided with a nylon lining.

10. The steering column according to claim 1 wherein one of said reaction members comprises a nut having an external shape, said nut engaging a correspondingly-shaped recess in said cam mechanism.

11. The steering column according to claim 10 wherein said shape is hexagonal.

12. The steering column assembly according to claim 1 wherein said inner member and said outer member are tubular.

13. The steering column assembly according to claim 1 wherein said bracket is U shaped having a base from which said arms depend.

14. A steering column assembly comprising:
a steering column shroud which supports a steering shaft for a steering wheel, said steering column shroud comprising an inner member and an outer member, said inner member being at least partially received and slidably mounted within said outer member,
a support bracket which is fixed in position relative to a part of a vehicle,
a clamp assembly which is movable between a locked position, in which said clamp assembly fixes said inner member and said outer member in position relative to said support bracket, and an unlocked position, in which said clamp assembly permits movement of at least one of said inner member and said outer member relative to said support bracket,
a cover sleeve positioned over said outer member along a portion of the length of said outer member, and
a steering anti-theft lock mechanism supported on said cover sleeve and fixed in position relative to said outer member,
said outer member includes an elongated slot with opposed edges extending axially along a length of said outer member such that when said clamp assembly is in its locked position, it squeezes said opposed edges of said slot of said outer member together thereby to at least partially close said slot which, in turn, clamps said outer member to said inner member, wherein
said cover sleeve covers a portion of said elongated slot, and
said slot in said outer member extends along a length of said steering shaft such that it passes below said steering anti-theft lock mechanism.

15. The steering column assembly according to claim 14 wherein said outer member is tubular and said cover sleeve is a tubular sleeve which fits around a portion of said outer member and which is secured to said outer member at a point along said shaft which is on an opposite side of said steering lock mechanism to said clamp.

16. The steering column assembly according to claim 14 wherein said cover sleeve is sufficiently rigid that it does not clamp onto said outer member with sufficient force to close said elongated slot when said steering lock mechanism is fastened in place.

17. The steering column assembly according to claim 14 wherein said outer member has a reduced diameter in a region covered by said cover sleeve such that said cover sleeve has the same diameter as said portion of outer member that is not of reduced diameter.

18. The steering column assembly according to claim 14 wherein said steering lock mechanism is a saddle clamp.

* * * * *